(12) United States Patent
Sunaga et al.

(10) Patent No.: US 6,454,960 B1
(45) Date of Patent: *Sep. 24, 2002

(54) REFRIGERATOR USING A POLYVINYL ETHER REFRIGERATOR OIL

(75) Inventors: Takashi Sunaga; Masato Watanabe, both of Gunma-ken (JP)

(73) Assignee: Sanyo Electric Co., Ltd., Osaka-fu (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/979,409

(22) Filed: Nov. 26, 1997

(30) Foreign Application Priority Data

Nov. 28, 1996 (JP) ............................................. 8-317949

(51) Int. Cl.[7] ................................................ F25B 41/00
(52) U.S. Cl. ........................... 252/67; 252/68; 62/114; 62/502
(58) Field of Search ...................... 252/68, 67; 62/114, 62/502

(56) References Cited

U.S. PATENT DOCUMENTS

| | | | | |
|---|---|---|---|---|
| 5,449,472 A | * | 9/1995 | Egawa et al. ................. | 252/68 |
| 5,454,963 A | * | 10/1995 | Kaneko ........................ | 252/68 |
| 5,518,643 A | * | 5/1996 | Egawa et al. ................. | 252/68 |
| 5,704,216 A | * | 1/1998 | Hirano et al. ................. | 62/114 |
| 5,956,959 A | | 9/1999 | Sunaga et al. ................ | 62/114 |

FOREIGN PATENT DOCUMENTS

| | | | |
|---|---|---|---|
| EP | 0451692 | * | 10/1991 |
| EP | 644175 | | 3/1995 |
| EP | 715079 | | 6/1996 |
| EP | 732391 A | | 9/1996 |
| EP | 0732391 | * | 9/1996 |
| JP | 1-271491 | | 10/1989 |
| JP | 8-209180 | * | 8/1996 |
| WO | 97/28236 | * | 8/1997 |

\* cited by examiner

*Primary Examiner*—Necholus Ogden
(74) *Attorney, Agent, or Firm*—Weingarten, Schurgin, Gagnebin & Lebovici LLP

(57) ABSTRACT

An object of the present invention is to obtain a good refrigerator using polyvinyl ether oil as a refrigerator oil, which is compatible with a hydrofluorocarbon type refrigerant not containing chlorine (such as R134a) without suffering conventional problems. A refrigerator of the present invention comprises a refrigerating cycle using a hydrofluorocarbon type refrigerant not containing chlorine or a refrigerant mixture thereof, with a refrigerator oil compatible with the refrigerant sealed, wherein the refrigerator oil comprises a polyvinyl ether type compound having a structural unit represented by the general formula (1) as the main component, with a pour point of $-40°$ C. or less, a two-liquid separation temperature of $-20°$ C. or less, a total acid number of 0.02 mgKOH/g or less, a viscosity of 8 to 100 cst at $40°$ C. or less, and a viscosity index of 80 or more,

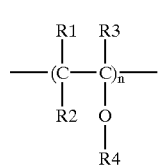

(1)

wherein n is an integral number in the range of 1 or more, R1 to R3 are each a hydrogen atom or a hydrocarbon group having 1 to 8 carbon atoms and may be the same or different, R4 is an alkyl group having 1 to 4 carbon atoms, and units in which R4 is an alkyl group having 1 to 2 carbon atoms are 40 to 100% and units in which R4 is an alkyl group having 3 to 4 carbon atoms are 0 to 60%.

10 Claims, 3 Drawing Sheets

REFRIGERATOR USING A POLYVINYL ETHER REFRIGERATOR OIL

CROSS REFERENCE TO RELATED APPLICATIONS

This application claims priority from U.S. application Ser. No. 08/939,667, filed Sep. 29, 1997, which issued as U.S. Pat. No. 5,956,959 on Sep. 28, 1999, which is fully incorporated by reference.

BACKGROUND OF THE INVENTION

1. Field of the Invention

The present invention relates to a refrigerator comprising a refrigerating cycle using a hydrofluorocarbon type refrigerant not containing chlorine such as 1,1,1,2-tetrafluoroethane (hereinafter referred to as R134a) or a refrigerant mixture thereof, having a polyvinyl ether oil as the base oil.

2. Background Art

Many of the conventional refrigerators and compressors for automatic vendors or show-cases used dichlorodifluoromethane (hereinafter referred to as R12). R12 has been under the flon regulation for preventing the ozone layer destruction. As a substitute refrigerant for R12, hydrofluorocarbon type refrigerants (HFC type, FC type) not containing chlorine represented by R134a are studied for the use of a refrigerator (see the official gazette of Japanese Patent Application Laid-Open (JP-A) No. 1-271491).

However, since the refrigerant R134a is poor in terms of compatibility with conventionally-used refrigerator oils, such as a mineral oil and an alkyl benzene oil, there is a problem of poor lubrication of a compressor due to deterioration of oil return to the compressor and inhalation of separated refrigerant at the time of starting after interval.

Therefore, the present inventors discussed the application of a polyol ester oil, which is compatible with the refrigerant R134a as the refrigerator oil. However, it is known that the polyol ester oil generates an aliphatic acid by thermal decomposition to cause corrosion in sliding members, which leads to abrasion.

Then the present inventors elaborately studied a combination of R134a as the refrigerant and a polyol ester oil as the refrigerator oil for the application in a refrigerant compressor. As a result, it was learned that in addition to the above-mentioned problem, a polyol ester oil is hydrolyzed by moisture to raise the total acid number so that metal soap is generated to be sludge and casts adverse effect on the refrigerating cycle, or is decomposed, oxidized to be deteriorated, and polymerized to generate metal soap or polymer sludge and casts adverse effect on the refrigerating cycle.

On the other hand, although it is known that a polyoxyalkylene glycol oil is not hydrolyzed and does not require strict care, due to its poor insulating property, it can not be used appropriately as it is in this kind of a refrigerant compressor comprising such a motor.

Then the present inventors found out that the above-mentioned problems can be solved by adding a certain additive to a polyvinyl ether oil with a special composition and combining with a certain HFC type refrigerant with a certain care.

SUMMARY OF THE INVENTION

An object of the present invention is to obtain a good refrigerator using polyvinyl ether oil as a refrigerator oil, which is compatible with a hydrofluorocarbon type refrigerant not containing chlorine (such as R134a) without suffering the above-mentioned problems.

A refrigerator according to claim 1 comprises a refrigerating cycle using a hydrofluorocarbon type refrigerant not containing chlorine or a refrigerant mixture thereof, with a refrigerator oil compatible with the refrigerant sealed, wherein the refrigerator oil comprises a polyvinyl ether type compound having a structural unit represented by the general formula (1) as the main component, with a pour point of −40° C. or less, a two-liquid separation temperature of −20° C. or less, a total acid number of 0.02 mgKOH/g or less, a viscosity of 8 to 100 cst at 40° C. or less, and a viscosity index of 80 or more,

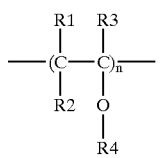

(1)

wherein n is an integral number in the range of 1 or more, R1 to R3 are each a hydrogen atom or a hydrocarbon group having 1 to 8 carbon atoms and may be the same or different, R4 is an alkyl group having 1 to 4 carbon atoms, and units in which R4 is an alkyl group having 1 to 2 carbon atoms are 40 to 100% and units in which R4 is an alkyl group having 3 to 4 carbon atoms are 0 to 60%.

In a refrigerator according to claim 2, the hydrofluorocarbon type refrigerant has a purity of 99.5% by weight or more, with the content of a chlorine type refrigerant of 2000 ppm or less.

In a refrigerator according to claim 3, the equilibrium moisture in the refrigerating cycle represented by the equation (2) is 200 ppm or less:

$$\frac{\text{(residual moisture content in the refrigerating cycle)}}{\text{(filled oil amount + filled refrigerant amount)}} \times 10^6 \text{ppm} \quad (2)$$

In a refrigerator according to claim 4, the residual oxygen content in the refrigerating cycle is 0.2% by weight or less with respect to the content volume of the refrigerating cycle.

In a refrigerator according to claim 5, the refrigerator oil contains 0.01 to 1.0% by weight of a phenol type antioxidant as an essential component and 0.01 to 2% by weight of an epoxy type or carbodiimide type compound with respect to its oil content.

In a refrigerator according to claim 6, the refrigerator oil contains 0.1 to 2% by weight of a phosphoric acid ester type compound with respect to its oil content.

In a refrigerator according to claim 7, the refrigerant is a 1,1,1,2-tetrafluoroethane (R134a), an azetropic mixture refrigerant containing 50% by weight of difluoromethane (R32) and 50% by weight of pentafluoroethane (R125), or a pseudoazetropic mixture refrigerant containing 44% by weight of pentafluoroethane (R125), 52% by weight of trifluoroethane (R143a) and 4% by weight of 1,1,1,2-tetrafluoroethane (R134a).

A refrigerator according to claim 8 comprises a compressor unit sealed in a hermetically sealed container, with an HFC type refrigerant or a refrigerant mixture thereof and a refrigerator oil compatible with the refrigerant sealed in the hermetically sealed container, wherein the refrigerator oil comprises a polyvinyl ether type compound having a structural unit represented by the general formula (1) as the main component, with a pour point of −40° C. or less, a two-liquid separation temperature of −20° C. or less, a total acid number of 0.02 mgKOH/g or less, a viscosity of 8 to 100 cst at 40° C. or less, and a viscosity index of 80 or more,

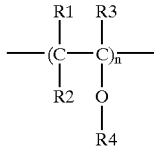 (1)

wherein n is an integral number in the range of 1 or more, R1 to R3 are each a hydrogen atom or a hydrocarbon group having 1 to 8 carbon atoms and may be the same or different, R4 is an alkyl group having 1 to 4 carbon atoms, and units in which R4 is an alkyl group having 1 to 2 carbon atoms are 80 to 100% and units in which R4 is an alkyl group having 3 to 4 carbon atoms are 0 to 20%.

In a refrigerator according to claim 9, the hydrofluorocarbon type refrigerant has a purity of 99.5% by weight or more, with the content of a chlorine type refrigerant of 2000 ppm or less.

In a refrigerator according to claim 10, the equilibrium moisture in the refrigerating cycle represented by the formula (2) is 200 ppm or less:

$$\frac{\text{(residual moisture content in the refrigerating cycle)}}{\text{(filled oil amount + filled refrigerant amount)}} \times 10^6 \text{ppm} \quad (2)$$

In a refrigerator according to claim 11, the residual oxygen content in the refrigerating cycle is 0.2% by weight or less with respect to the content volume of the refrigerating cycle.

In a refrigerator according to claim 12, the refrigerant comprises at least two compounds selected from the group consisting of hydrofluorocarbon types represented by the general formula (3):

$$C_lH_mF_n \quad (3)$$

wherein when l=1, m=1~2, n=2~3 and m+n=4, when l=2, m=1~4, n=2~5 and m+n=6, and when l=3, m=1~3, n=5~7 and m+n=8.

In a refrigerator according to claim 13, the refrigerant is an azetropic mixture refrigerant containing 50% by weight of difluoromethane (R32) and 50% by weight of pentafluoroethane (R125), or a pseudoazetropic mixture refrigerant containing 44% by weight of pentafluoroethane (R125), 52% by weight of trifluoroethane (R143a) and 4% by weight of 1,1,1,2-tetrafluoroethane (R134a).

In a refrigerator according to claim 14, the refrigerator oil contains 0.01 to 1.0% by weight of a phenol type antioxidant as an essential component and 0.01 to 2% by weight of an epoxy type or carbodiimide type compound with respect to its oil content.

In a refrigerator according to claim 15, the refrigerator oil contains 0.1 to 2% by weight of a phosphoric acid ester type compound with respect to its oil content.

A refrigerator according to claim 16 comprises a compressor unit sealed in a hermetically sealed container, with an HFC type refrigerant or a refrigerant mixture thereof and a refrigerator oil compatible with the refrigerant sealed in the hermetically sealed container, wherein the refrigerator oil comprises a polyvinyl ether type compound having a structural unit represented by the general formula (1) as the main component, with a pour point of −40° C. or less, a two-liquid separation temperature of −20° C. or less, a total acid number of 0.02 mgKOH/g or less, a viscosity of 8 to 100 cst at 40° C. or less, and a viscosity index of 80 or more,

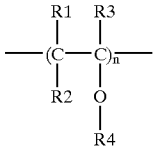 (1)

wherein n is an integral number in the range of 1 or more, R1 to R3 are each a hydrogen atom or a hydrocarbon group having 1 to 8 carbon atoms and may be the same or different, R4 is an alkyl group having 1 to 4 carbon atoms, and units in which R4 is an alkyl group having 1 to 2 carbon atoms are 60 to 100% and units in which R4 is an alkyl group having 3 to 4 carbon atoms are 0 to 40%.

In a refrigerator according to claim 17, the hydrofluorocarbon type refrigerant has a purity of 99.5% by weight or more, with the content of a chlorine type refrigerant of 2000 ppm or less.

In a refrigerator according to claim 18, the equilibrium moisture in the refrigerating cycle represented by the formula (2) is 200 ppm or less:

$$\frac{\text{(residual moisture content in the refrigerating cycle)}}{\text{(filled oil amount + filled refrigerant amount)}} \times 10^6 \text{ppm} \quad (2)$$

In a refrigerator according to claim 19, the residual oxygen content in the refrigerating cycle is 0.2% by weight or less with respect to the content volume of the refrigerating cycle.

In a refrigerator according to claim 20, the refrigerant comprises at least two compounds selected from the group consisting of hydrofluorocarbon types represented by the general formula (3):

$$C_lH_mF_n \quad (3)$$

wherein when l=1, m=1~2, n=2~3 and m+n=4, when l=2, m=1~4, n=2~5 and m+n=6, and when l=3, m=1~3, n=5~7 and m+n=8.

In a refrigerator according to claim 21, the refrigerant is a pseudoazetropic mixture refrigerant containing 23% by weight of difluoromethane (R32), 25% by weight of pentafluoroethane (R125), 52% by weight of 1,1,1,2-tetrafluoroethane (R134a), or a pseudeoazeotropic mixture refrigerant containing 25% by weight of difluoromethane (R32), 15% by weight of pentafluoroethane (R125), 60% by weight of 1,1,1,2-tetrafluoroethane (R134a).

In a refrigerator according to claim 22, the refrigerator oil contains 0.01 to 1.0% by weight of a phenol type antioxidant as an essential component and 0.01 to 2% by weight of an epoxy type or carbodiimide type compound with respect to its oil content.

In a refrigerator according to claim 23, the refrigerator oil contains 0.1 to 2% by weight of a phosphoric acid ester type compound with respect to its oil content.

A refrigerator according to claim 24 comprises a refrigerant compressor, a condenser, an expansion device, and an evaporator, connected to each other with pipes, with an HFC type refrigerant or a refrigerant mixture thereof and a refrigerator oil compatible with the refrigerant sealed in a hermetically sealed container, wherein the refrigerator oil comprises a polyvinyl ether type compound having a structural unit represented as the main component, with a pour point of −40° C. or less, a two-liquid separation temperature of −20° C. or less, a total acid number of 0.02 mgKOH/g or less, a viscosity of 8 to 100 cst at 40° C. or less, and a viscosity index of 80 or more.

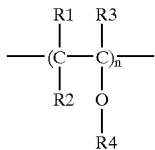

(1)

wherein n is an integral number in the range of 1 or more, R1 to R3 are each a hydrogen atom or a hydrocarbon group having 1 to 8 carbon atoms and may be the same or different, R4 is an alkyl group having 1 to 4 carbon atoms, and units in which R4 is an alkyl group having 1 to 2 carbon atoms are 40 to 100% and units in which R4 is an alkyl group having 3 to 4 carbon atoms are 0 to 60%.

BRIEF DESCRIPTION OF THE DRAWINGS

These objects and advantages of the present invention will become clear from the following description with reference to the accompanying drawings, wherein.

DETAILED DESCRIPTION OF THE PREFERRED EMBODIMENTS

Hereinafter the present invention will be described with reference to accompanied drawings.

Figure 1:
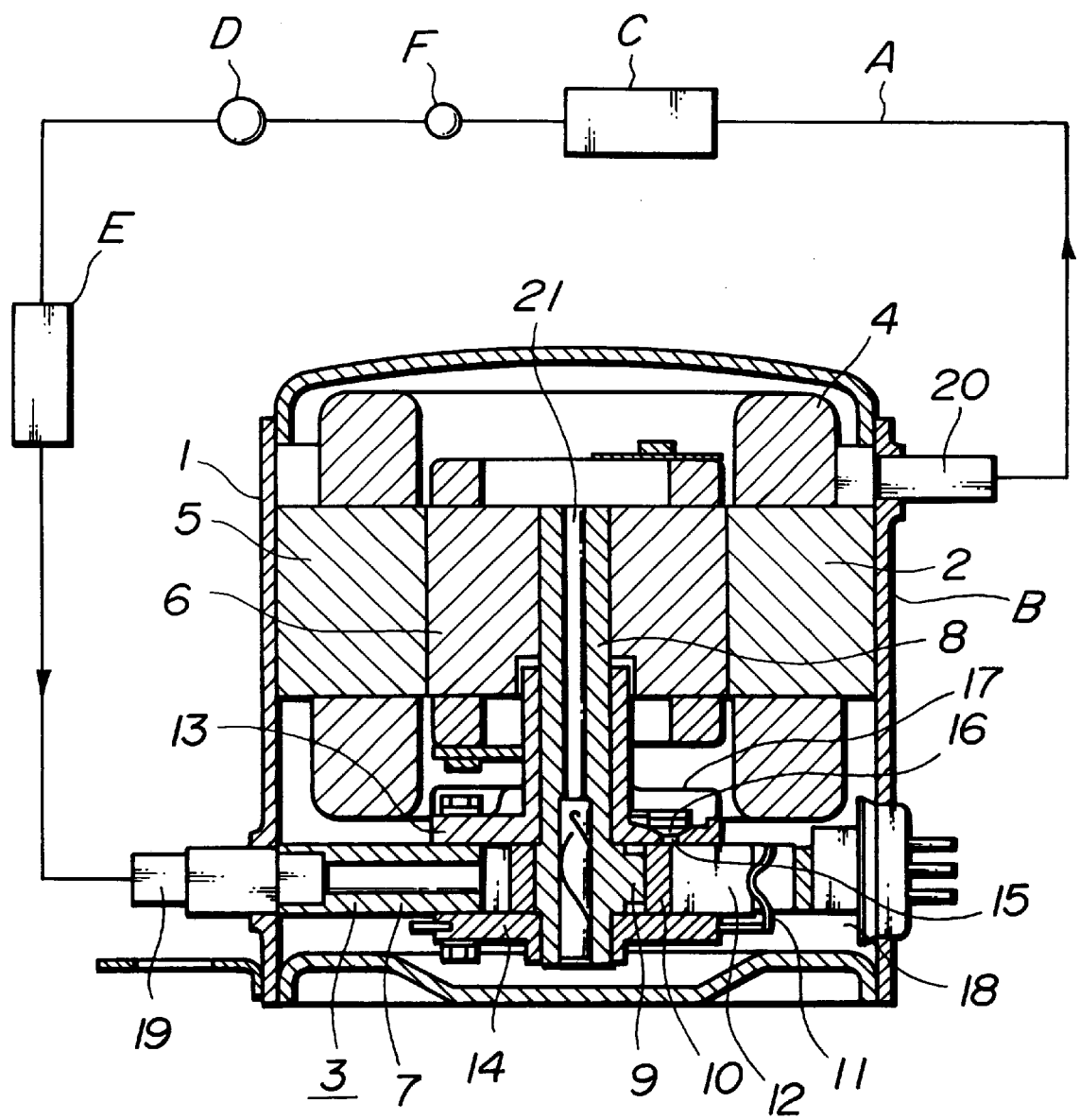
FIG. 1 is a vertical cross-sectional view of a rotary type compressor of one embodiment of the present invention.

FIG. 1 is a vertical cross-sectional view of a rotary type compressor. In FIG. 1, A represents a refrigerating cycle comprising a refrigerator. The refrigerating cycle A comprises a compressor B, a condenser C, an expansion device D, an evaporator E, and a drier F, connected with pipes. The compressor B has the below-mentioned configuration.

Numeral 1 represents a hermetically sealed container, where an electric driving element 2 is stored at the upper part and a rotary compressing element 3 driven by the electric driving element 2 is stored at the lower part, respectively. The electric driving element 2 comprises a stator 5 having a winding 4 insulated with an organic material, and a rotor 6 provided inside the stator 5. The rotary compressing element 3 comprises a cylinder 7, a roller 10 rotated along the inner wall of the cylinder 7 by an eccentric portion 9 of a rotary shaft 8, a vane 12 pressed by a spring 11 so as to contact with the periphery of the roller 10 with pressure and divide the inside of the cylinder 7 into an inhaling side and a discharging side, and an upper bearing 13 and a lower bearing 14 for sealing the openings of the cylinder 7 as well as supporting the rotary shaft 8 axially.

The upper bearing 13 is provided with a discharging hole 15, communicating with the discharging side of the cylinder 7. Further, a discharging valve 16 for switching the discharging hole 15 and a discharging muffler 17 are mounted on the upper bearing 13.

The roller 10 and the vane 12 are made from an iron material.

An oil 18 is stored at the bottom part of the hermetically sealed container 1. The oil 18 comprises a polyvinyl ether type compound having a structural unit represented by the general formula (1) as the main component, with a pour point of −40° C. or less, a two-liquid separation temperature of −20° C. or less, a total acid number of 0.02 mgKOH/g or less, a viscosity of 8 to 100 cst at 40° C. or less, and a viscosity index of 80 or more,

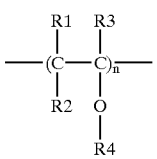

(1)

wherein n is an integral number in the range of 1 or more, R1 to R3 are each a hydrogen atom or a hydrocarbon group having 1 to 8 carbon atoms and may be the same or different, R4 is an alkyl group having 1 to 4 carbon atoms, and units in which R4 is an alkyl group having 1 to 2 carbon atoms are 40 to 100% and units in which R4 is an alkyl group having 3 to 4 carbon atoms are 0 to 60%.

A phenol type antioxidant of 2,6-di-tart.butyl-p-cresol (DBPC) is added to the polyvinyl ether oil by 0.3% by weight as an additive for preventing deterioration by oxidization after long term storage. Furthermore, an epoxy type additive is added by 0.25% by weight as a chemical stabilizer.

An extreme-pressure additive of tricresyl phosphate (TCP) is also added to the polyvinyl ether oil by 1% by weight as needed.

A hydrofluorocarbon type refrigerant not containing chlorine, such as R134a is sealed in the refrigerating cycle A.

R134a is adjusted so as to have a purity of 99.5% by weight or more and a chlorine type refrigerant content of 56 ppm. The equilibrium moisture in the refrigerating cycle A represented by the below-mentioned formula (2) is adjusted to be 150 ppm:

$$\frac{\text{(residual moisture content in the refrigerating cycle)}}{\text{(filled oil amount + filled refrigerant amount)}} \times 10^6 \text{ppm} \qquad (2)$$

A moisture adsorbing agent having a pore diameter of about 3 Å is used in the drier F of the refrigerating cycle A. Further, the residual oxygen content in the refrigerating cycle A is adjusted to be 0.005% by weight of the cycle content volume.

The wiring 4 of the electric driving element 2 of the compressor B is coated with a double-structure insulating material including a layer of heat-resistant ester (THEIC) or esterimide at the inner side and a layer of amideimide at the outer side. A PET film of a low oligomer specification (0.6% or less as a trimer) is used as the insulating paper H for insulating between the wiring 4.

The oil 18 lubricates the sliding faces of the roller 10 and the vane 12, which are sliding members of the rotary compressing element 3.

A refrigerant to flow into the cylinder 7 of the rotary compressing element 3 so as to be compressed by the cooperation of the roller 10 and the vane 12 comprises R134a, which is compatible with the oil 18, that is, a polyol ester oil.

Numeral 19 represents an inhaling pipe to be mounted on the hermetically sealed container 1 for guiding the refrigerant to the inhaling side of the cylinder 7, and numeral 20 represents a discharging pipe to be mounted on the upper wall of the hermetically sealed container 1 and compressed by the rotary compressing element 3 for discharging the refrigerant to the outside of the hermetically sealed container 1 via the electrically-driving element 2.

In the refrigerator oil composition used in the rotary type compressor with the above-mentioned configuration, the refrigerant R134a flown into the inhaling side of the cylinder 7 of the inhaling pipe 19 is compressed by the cooperation of the roller 10 and the vane 12 and opens the discharging valve 16 through the discharging hole 15 so as to be discharged into the discharging muffler 17. The refrigerant in the discharging muffler 17 is discharged outside the hermetically sealed container 1 from the discharging pipe 20 via the electric driving element 2. The oil 18 is supplied to sliding members, such as the sliding surfaces of the roller 10 and the vane 12 of the rotary compressing element 3 for lubrication. Further, it prevents leakage of the refrigerant compressed in the cylinder 7 to the low pressure side.

According to this embodiment, the following effects can be achieved.

According to the configuration of claim 1, the polyvinyl ether oil 18 of the present invention has a good compatibility with R134a in the entire temperature range used in the refrigerator A so that the two-layer separation of the refrigerant and the oil can be prevented.

Therefore, since the polyvinyl ether oil 18 can always exist in the state of being dissolved in R134a in a low temperature range of −30° C. or lower in the refrigerating cycle A so as to be of a low viscosity as a whole, the oil return to the compressor B becomes good. Accordingly, the oil supply to the bearing sliding portions 8, 13, 14 can be ensured without lowering the oil surface of the compressor B so that galling or seizure can be prevented.

Furthermore, the polyvinyl ether oil 18 of the present invention can lower the actual viscosity and reduce the mechanical loss to improve the performance coefficient of the compressor B owing to the function characteristic of oils of improving the lubrication on the iron sliding portions including the shaft 8, and the bearings 13, 14 of the compressor B and a function of easily dissolving with a refrigerant (R134a).

According to the configuration of claim 2, since the purity of the R134a refrigerant is extremely high, a chemically-stable performance can be achieved without the contamination of a foreign substance or CFC in the refrigerating cycle A.

According to the configuration of claim 3, corrosion in the refrigerator and deterioration of a motor insulating material (PET material) can be prevented.

According to the configuration of claim 4, deterioration by oxidization of the polyvinyl ether oil 18 and generation of sludge caused by polymerization can be prevented so that a highly reliable refrigerator can be provided.

According to the configuration of claim 5, the polyvinyl ether oil 18 can improve the stability with respect to the oxidized deterioration so that the performance and reliability of the compressor B can be improved.

This was confirmed by the experiment result of a sealed tube test with the polyvinyl ether oil 18 containing DBPC of the present invention sealed.

That is, according to the polyvinyl ether oil 18 containing DBPC of the present invention in the conditions of aging at 90° C. for 29 days for adjusting the moisture content to be 200 ppm, the total acid number became 0.01 or less at the initial stage so as to have a preferable result.

According to the configuration of claim 6, a strong chemical adsorption film can be formed on the bearing sliding surfaces 8, 10, 13, 14 so that the lubrication of the sliding portions 8, 10, 13, 14 is further improved to prevent galling and seizure.

Figure 2:
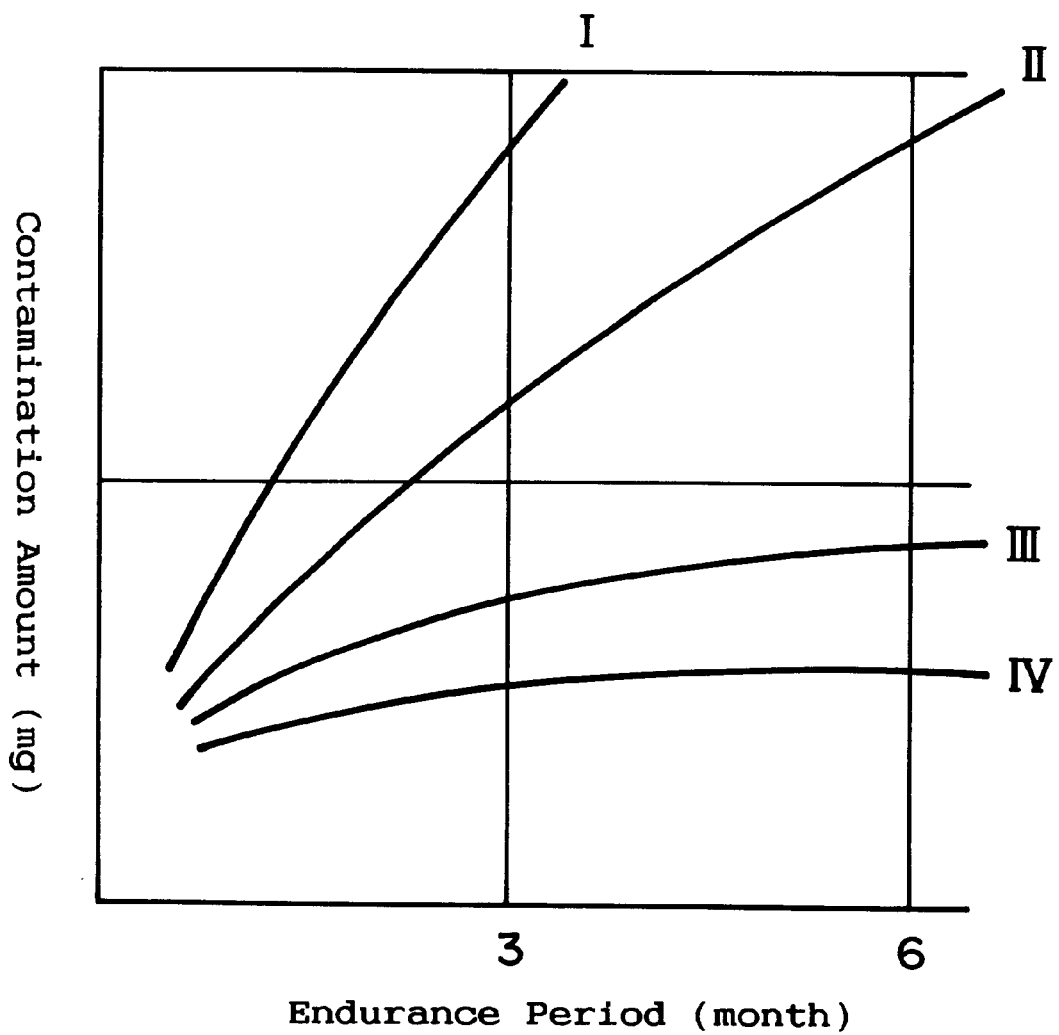
FIG. 2 is a graph showing the result of an endurance test of a refrigerator.

The above-mentioned effects were confirmed also by the endurance test result with the device shown in FIG. 2.

That is, in the graph of FIG. 2 with the endurance test time plotted in horizontal axis and the contamination amount (sludge amount) plotted in vertical axis, the best result was obtained with the specimen IV using a specimen Y of the polyvinyl ether oil 18 of the present invention containing additives (DBPC, epoxy, etc.) under the standard B with the production standard of the device restricted according to the present invention (restriction on purity of the refrigerant, moisture in the refrigerating cycle A, chlorine and air amount).

Wherein FIG. 2, the contents of the specimen I–IV is represented as below.

TABLE 1

|     | additive | production standard |
|-----|----------|---------------------|
| I   | none     | A                   |
| II  | X        | A                   |
| III | Y        | A                   |
| IV  | Y        | B                   |

Additive X: DBPC + BTA + TCP
Additive Y: DBPC + BTA + TCP + epoxy

Production standard A: (conventional standard)
Refrigerant purity: 99.90% by weight
    Equilibrium moisture content in the refrigerating cycle A: 600 ppm
    Residual air content in the refrigerating cycle A: 0.03% by weight
    Chlorine residual content in the refrigerating cycle A: 400 ppm
Standard B: (standard of the present invention)
Refrigerant purity: 99.95% by weight
    Equilibrium moisture content in the refrigerating cycle A: 200 ppm
    Residual air content in the refrigerating cycle A: 0.01% by weight
    Chlorine residual content in the refrigerating cycle A: 100 ppm Although R134a is provided as an example of a hydrofluorocarbon type refrigerant not containing chlorine in the present invention, it is not limited thereto since a polyvinyl ester oil of the present invention shows an excellent compatibility with other HFC type refrigerants so that it can be applied to the refrigerants.

Figure 3:
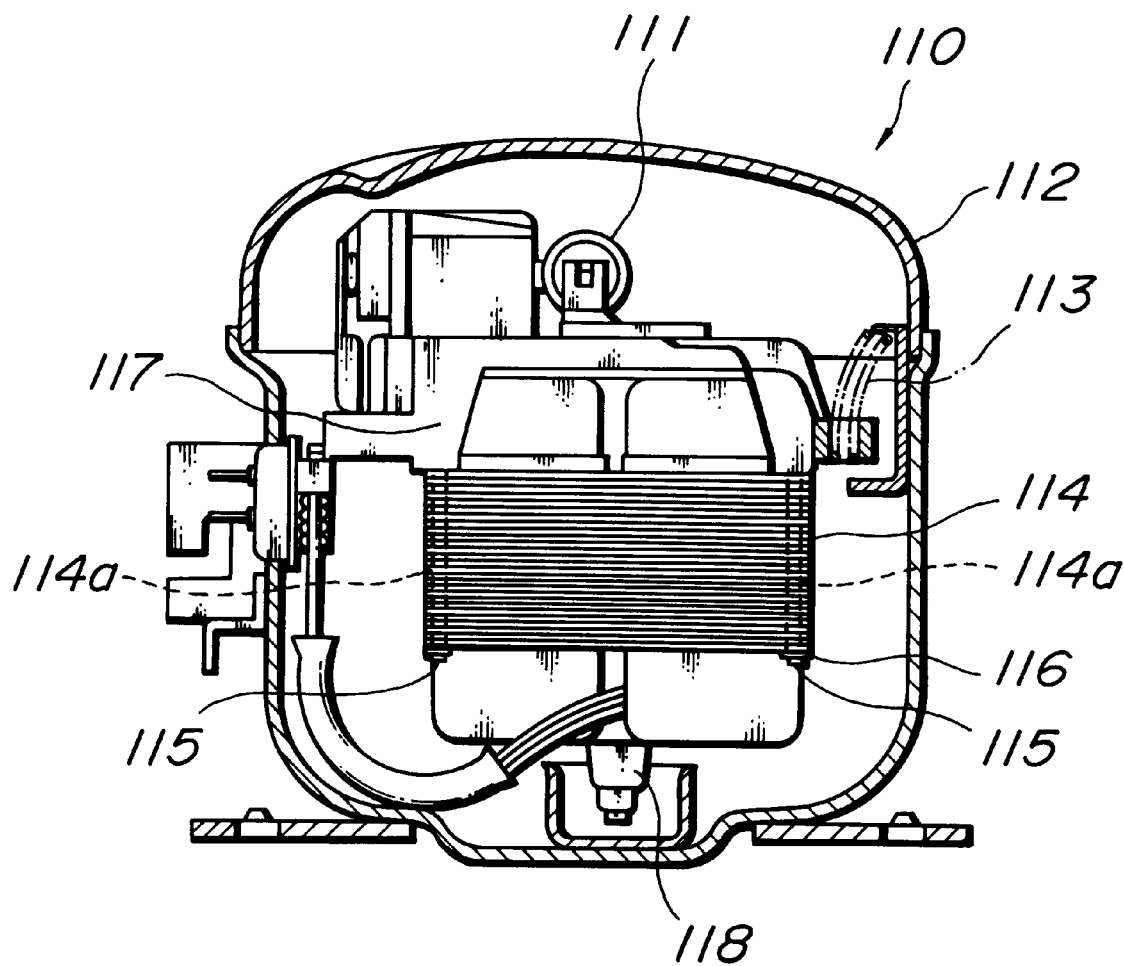
FIG. 3 is a vertical cross-sectional view of a reciprocating type compressor of another embodiment of the present invention.

FIG. 3 shows a Scotch York type reciprocating type compressor of another embodiment of the present invention. The entire configuration shown in FIG. 3 comprises a compressor 110, a mechanical portion 111 for compressing a refrigerant, a case 112, an underslung spring 113, a stator 114 comprising an electric driving portion (electric driving element of the compressor), stator fixing bolts 115, and washers 116 of a synthetic rubber.

The compressor further comprises a stator mounting leg 117, and a crank shaft 118. A predetermined gap is provided between the stator 114 and the rotor for driving the rotor as an electric driving element of an ordinary compressor.

The compressor main body comprises the electric driving portion for driving the above-mentioned mechanical portion 111, and the compressor main body is hanged on the case 112 by the underslung spring 113.

The stator 114 is fixed to the stator fixing leg 117 by a plurality of stator fixing bolts 115 via the washer 116 of a synthetic rubber.

As heretofore mentioned, according to the present invention, a preferable refrigerator can be obtained since the total acid number of a polyvinyl ether oil is reduced to restrain the generation of a metal soap to prevent adverse effect on the refrigerating cycle, and decomposition, oxidization deterioration, or polymerization reaction by the effect of oxygen or chlorine is restrained to prevent the generation of a metal soap and a polymer sludge by using a certain material for the polyvinyl ether oil in a certain physical property range with a special additive, maintaining the purity of a hydrofluorocarbon type refrigerant at a high value or restraining the equilibrium moisture of the refrigerating cycle.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. A refrigerator comprising a compressor unit sealed in a hermetically sealed container, with an hydrofluorocarbon refrigerant or a refrigerant mixture thereof and a refrigerator oil compatible with the refrigerant unit sealed in the hermetically sealed container, wherein the refrigerator oil comprises a polyvinyl ether compound having a structural unit represented by the general formula (1) as the main component, with a pour point of −40° C. or less, a two-liquid separation temperature of −20° C. or less, a total acid number of 0.02 mgKOH/g or less, a viscosity of 8 to 100 cst at 40° C. or less, and a viscosity index of 80 or more,

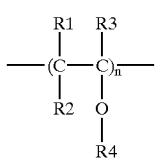   (1)

wherein n is an integral number in the range of 1 or more, R1, R2 and R3 are each a hydrogen atom or a hydrocarbon group having 1 to 8 carbon atoms and may be the same or different from each other, R4 is an alkyl group having 2 to 3 carbon atoms, and wherein units in which R4 is an alkyl group having 2 carbon atoms are 80% or more and less than 100% of the polyvinyl ether compound, and wherein the percentage of units in which R4 is an alkyl group having 3 carbon atoms are 20% or less of the polyvinyl ether compound.

2. The refrigerator according to claim 1, wherein the hydrofluorocarbon refrigerant has a purity of 99.5% by weight or more, with a content of a chlorine-containing refrigerant of 2000 ppm or less.

3. The refrigerator according to claim 1, wherein the equilibrium moisture in the refrigerating cycle represented by the formula (2) is 200 ppm or less:

   (2)

4. The refrigerator according to claim 1, wherein the residual oxygen amount in the refrigerating cycle is 0.2% by weight or less with respect to the content volume of the refrigerating cycle.

5. The refrigerator according to claim 1, wherein the refrigerant comprises at least two compounds selected from the group consisting of hydrofluorocarbons represented by the general formula (3):

$$C_lH_mF_n$$ (3):

wherein when l=1, m=1~2, n=2~3 and m+n=4, when l=2, m=1~4, n=2~5 and m+n=6, and when l=3, m=1~3, n=5~7 and m+n=8.

6. The refrigerator according to claim 1, wherein the refrigerant is an azetropic mixture refrigerant containing 50% by weight of difluoromethane (R32) and 50% by weight of pentafluoroethane (R125), or a pseudoazetropic mixture refrigerant containing 44% by weight of pentafluoroethane (R125), 52% by weight of trifluoroethane (R143a) and 4% by weight of 1,1,1,2-tetrafluoroethane (R134a).

7. The refrigerator according to claim 1, wherein the refrigerator oil contains 0.01 to 1.0% by weight of a phenol antioxidant as an essential component and 0.01 to 2% by weight of an epoxy or carbodiimide compound, with respect to the oil content.

8. The refrigerator according to claim 3, wherein the refrigerator oil contains 0.1 to 2% by weight of a phosphoric acid ester compound with respect to the oil content.

9. The refrigerator according to claim 1, wherein the refrigerant is a pseudoazetropic mixture refrigerant containing 23% by weight of difluoromethane (R32), 25% by weight of pentafluoroethane (R125), 52% by weight of 1,1,1,2-tetrafluoroethane (R134a), or a pseudoazetropic mixture refrigerant containing 25% by weight of difluoromethane (R32), 15% by weight of pentafluoroethane (R125), 60% by weight of 1,1,1,2-tetrafluoroethane (R134a).

10. A refrigerator comprising a refrigerant compressor, a condenser, an expansion device, and an evaporator, connected to each other with pipes, with an HFC type refrigerant or a refrigerant mixture thereof and a refrigerator oil compatible with the refrigerant sealed in a hermetically sealed container, wherein the refrigerator oil comprises a polyvinyl ether compound having a structural unit represented by the general formula (1) as the main component, with a pour point of −40° C. or less, a two liquid separation temperature of −20° C. or less, a total acid number of 0.02 mgKOH/g or less, a viscosity of 8 to 100 cst at 40° C. or less, and a viscosity index of 80 or more,

   (1)

wherein n is an integral number in the range of 1 or more, R1 to R3 are each a hydrogen atom or a hydrocarbon group having 1 to 8 carbon atoms and may be the same or different from each other, R4 is an alkyl group having 2 to 3 carbon atoms, and wherein units in which R4 is an alkyl group having 2 carbon atoms are 80% or more and less than 100% of the polyvinyl ether compound, and wherein units in which R4 is an alkyl group having 3 carbon atoms are 20% or less of the polyvinyl ether compound.

* * * * *

UNITED STATES PATENT AND TRADEMARK OFFICE
CERTIFICATE OF CORRECTION

PATENT NO.    : 6,454,960 B1
DATED         : September 24, 2002
INVENTOR(S)   : Takashi Sunaga et al.

It is certified that error appears in the above-identified patent and that said Letters Patent is hereby corrected as shown below:

<u>Column 6,</u>
Lines 66-67, "polyol ester oil" should read -- polyvinyl ether oil --;

<u>Column 8,</u>
Line 51, "ester" should read -- ether --; and

<u>Column 9,</u>
Line 1, "hanged" should read -- hung --.

Signed and Sealed this

Twenty-third Day of September, 2003

JAMES E. ROGAN
*Director of the United States Patent and Trademark Office*